US008783025B2

(12) United States Patent
Hindman et al.

(10) Patent No.: US 8,783,025 B2
(45) Date of Patent: Jul. 22, 2014

(54) SPLIT VALVE PUMP CONTROLLED HYDRAULIC SYSTEM

(75) Inventors: Jahmy J Hindman, Durango, IA (US); Jeffrey W Dobchuk, Saskatoon (CA); Eric Richard Anderson, Ames, IA (US)

(73) Assignee: Deere & Company, Moline, IL (US)

( * ) Notice: Subject to any disclaimer, the term of this patent is extended or adjusted under 35 U.S.C. 154(b) by 742 days.

(21) Appl. No.: 13/036,850

(22) Filed: Feb. 28, 2011

(65) Prior Publication Data

US 2012/0216871 A1 Aug. 30, 2012

(51) Int. Cl.

| | |
|---|---|
| ***F16D 31/00*** | (2006.01) |
| ***F16D 33/00*** | (2006.01) |
| ***F16D 37/00*** | (2006.01) |
| ***F16D 39/00*** | (2006.01) |
| ***F16D 31/02*** | (2006.01) |

(52) U.S. Cl.

USPC .................................. 60/327; 60/421; 60/429

(58) Field of Classification Search

CPC ....................... F15B 11/17; F15B 2211/20576

USPC ........................................... 60/421, 429, 327

See application file for complete search history.

(56) References Cited

U.S. PATENT DOCUMENTS

| | | | | |
|---|---|---|---|---|
| 6,357,231 | B1 * | 3/2002 | Duppong | 60/421 |
| 7,059,125 | B2 | 6/2006 | Oka et al. | |
| 7,316,111 | B2 * | 1/2008 | Krieger | 60/421 |
| 2011/0056194 | A1 * | 3/2011 | Wojcicki et al. | 60/428 |

FOREIGN PATENT DOCUMENTS

| | | | |
|---|---|---|---|
| DE | 10354022 | A1 | 6/2004 |
| DE | 112008002786 | T5 | 10/2010 |
| JP | 3084204 | A | 3/2002 |
| WO | 9410455 | A1 | 5/1994 |

OTHER PUBLICATIONS

German Search Report in Counterpart German Application No. 102012202952.4 (5 pages) (Jan. 14, 2013).

* cited by examiner

*Primary Examiner* — Edward Look
*Assistant Examiner* — Daniel Collins
(74) *Attorney, Agent, or Firm* — Taft Stettinius & Hollister LLP; Stephen F. Rost

(57) ABSTRACT

A hydraulic system that includes a controller controlling multiple hydraulic pumps to power multiple hydraulic functions. Any ratio of flow can be directed from each of the pumps to each of the functions, including having a pump dedicated to each function, or having one pump dedicated to one function and another pump supplying multiple functions including the one function. The controller can receive machine feedback and failure data indicating regions of the system with functional disruptions, and can direct flow from the pumps to the functions along routes that avoid the functional disruptions. The system can include operator input devices that provide operator inputs to the controller for controlling the system. The system can operate the hydraulic system in different modes, including modes to improve fuel efficiency and to improve productivity. The system can include a mode switch for operator selection of a desired mode.

19 Claims, 3 Drawing Sheets

SPLIT VALVE PUMP CONTROLLED HYDRAULIC SYSTEM

FIELD OF THE INVENTION

The present invention generally relates to hydraulic systems, and more specifically to control of a plurality of pumps and a plurality of valves to minimize hydraulic losses during a work cycle.

BACKGROUND OF THE INVENTION

Hydraulic systems can have 'compensation losses' associated with attempting to establish flow control to multiple functions that are experiencing different loads in a system. An example of this is a conventional load sensing system that sets the hydraulic supply pressure according to the highest sensed load pressure. Excess hydraulic pressure is supplied to the other functions experiencing lesser load pressure, which wastes power and fuel. One of the most common attempts to eliminate compensation losses in a hydraulic system is to eliminate the control valve and use hydrostatic pumps to control some functions, for example the boom of a wheel loader.

It would be desirable to have a hydraulic system that had one or more of the following capabilities: the capability to direct flow from multiple hydraulic sources to multiple functions and share the flow in selectable ratios between the sources and functions; the capability to direct flow from one hydraulic supply to one function while directing flow from a second hydraulic supply to a second function; and the capability to, in the case of a failure, make use of the remaining components to continue to supply hydraulic fluid to each of the functions.

SUMMARY

A hydraulic system and control system architecture is disclosed that makes use of electronic control of a plurality of open circuit pumps and a plurality of valves to minimize hydraulic losses during a work cycle. The hydraulic system includes two or more hydraulic sources, a series of electronically controlled valves, a controller, operator input device and other instrumentation. The displacement of each of the hydraulic sources can be controlled electronically and independent of the other hydraulic sources. For each hydraulic source, the series of electronically controlled valves can direct hydraulic fluid to multiple functions and return hydraulic fluid from those functions to a reservoir. The instrumentation, operator input device and controller can determine the machine mode, and can alter the commands to the pumps and valves based on the machine mode. The operator input device can be one of the inputs to the controller which provides commands to the electric-hydraulic system.

A hydraulic system is disclosed that includes first and second hydraulic sources, a first function actuator for performing a first function, a second function actuator for performing a second function, first and second valve stacks and a controller. The first valve stack includes a first valve for controlling flow from the first hydraulic source to the first function actuator, and a second valve for controlling flow from the first hydraulic source to the second function actuator. The second valve stack includes a first valve for controlling flow from the second hydraulic source to the first function actuator, and a second valve for controlling flow from the second hydraulic source to the second function actuator. The controller controls flow from the first hydraulic source to the first function actuator through the first valve of the first valve stack, and flow from the first hydraulic source to the second function actuator through the second valve of the first valve stack, and flow from the second hydraulic source to the first function actuator through the first valve of the second valve stack, and flow from the second hydraulic source to the second function actuator through the second valve of the second valve stack.

The controller can direct any ratio of flow from the first and second hydraulic sources to the first and second function actuators, including having the first hydraulic source providing flow to only one of the first and second function actuator and having the second hydraulic source providing flow to only the other of the first and second function actuator. The controller can direct all flow from the first hydraulic source to the first function actuator and any ratio of flow from the second hydraulic source to the first and second function actuators. The controller can receive failure data indicating regions of the system with functional disruptions (for example, hydraulic or electrical faults in the system), and the controller can use the failure data to direct flow from the first and second hydraulic sources to the first and second function actuators along a route that avoids the regions of the system with functional disruptions.

The hydraulic system can include an operator input device that provides operator inputs to the controller for controlling the first function actuator in performing the first function, and for controlling the second function actuator in performing the second function. Alternatively, the hydraulic system can include first and second operator input devices where the first operator input device provides operator inputs to the controller for controlling the first function actuator in performing the first function, and the second operator input device provides operator inputs to the controller for controlling the second function actuator in performing the second function. The hydraulic system can also include a mode switch for operator selection of a desired mode for the hydraulic system, and the controller can use the selected desired mode in determining flow from the first hydraulic source to the first and second function actuators and from the second hydraulic source to the first and second function actuators.

The controller of the hydraulic system can receive machine physical feedback. The controller can use the machine feedback in determining flow from the first hydraulic source to the first and second function actuators and from the second hydraulic source to the first and second function actuators.

The hydraulic system can include a first valve actuator that positions the first valve of the first valve stack, a second valve actuator that positions the second valve of the first valve stack, a third valve actuator that positions the first valve of the second valve stack, and a fourth valve actuator that positions the second valve of the second valve stack. The first and second valves of the first valve stack and the first and second valves of the second valve stack can be spool valves. In this embodiment, the hydraulic system can include a first set of spool actuators that position the first spool valve of the first valve stack, a second set of spool actuators that position the second spool valve of the first valve stack, a third set of spool actuators that position the first spool valve of the second valve stack, and a fourth set of spool actuators that position the second spool valve of the second valve stack.

A control method for a hydraulic system of a machine is disclosed, where the hydraulic system includes first and second hydraulic pumps to power first and second hydraulic functions of the machine, and the hydraulic system can direct any ratio of flow from the first hydraulic source to the first and second functions and from the second hydraulic source to the first and second functions. The control method includes receiving operator input for performing the hydraulic functions, receiving physical feedback from the machine, determining a determined operating mode for the machine using the operator input and the machine physical feedback, determining power availability of the hydraulic system using the determined operating mode and the machine physical feedback, detecting fault modes of the machine using the machine physical feedback, determining a flow map for the hydraulic system using the power availability and the detected fault modes, sending pump control commands to the first and second pumps to implement the flow map; and sending valve control commands to valves and actuators of the hydraulic system to implement the flow map. The flow map defines an amount of flow from the first hydraulic source to the first hydraulic function, an amount of flow from the first hydraulic source to the second hydraulic function, an amount of flow from the second hydraulic source to the first hydraulic function, and an amount of flow from the second hydraulic source to the second hydraulic function. The detected fault modes can indicate regions of the hydraulic system with functional disruptions, and the flow map can be determined to direct flow from the first and second hydraulic pumps to the first and second hydraulic functions along a route that avoids the regions of the hydraulic system with functional disruptions.

The hydraulic control system can include first and second valve stacks. The first valve stack includes a first valve for controlling flow from the first hydraulic source to the first function actuator, and a second valve for controlling flow from the first hydraulic source to the second function actuator. The second valve stack includes a first valve for controlling flow from the second hydraulic source to the first function actuator, and a second valve for controlling flow from the second hydraulic source to the second function actuator. The valve control commands control the first and second valves of the first valve stack and the first and second valves of the second valve stack. The hydraulic system can also include a first valve actuator for positioning the first valve of the first valve stack, a second valve actuator for positioning the second valve of the first valve stack, a third valve actuator for positioning the first valve of the second valve stack, and a fourth valve actuator for positioning the second valve of the second valve stack; where the valve control commands can control the first, second, third and fourth valve actuators.

The operator input can be received from a first operator input device that provides operator inputs for controlling the first hydraulic function, and a second operator input device that provides operator inputs for controlling the second hydraulic function. Operator input can also be received from a desired mode switch that the operator can use to select a desired mode for the hydraulic system; and the operator selected desired mode can be used in determining the determined operating mode.

The determined operating mode can be selected from an economy mode designed to utilize the hydraulic system focusing on fuel efficiency, a productivity mode designed to utilize the hydraulic system focusing on productivity, and a normal mode designed to utilize the hydraulic system balancing fuel efficiency with productivity.

DETAILED DESCRIPTION

Figure 1A:
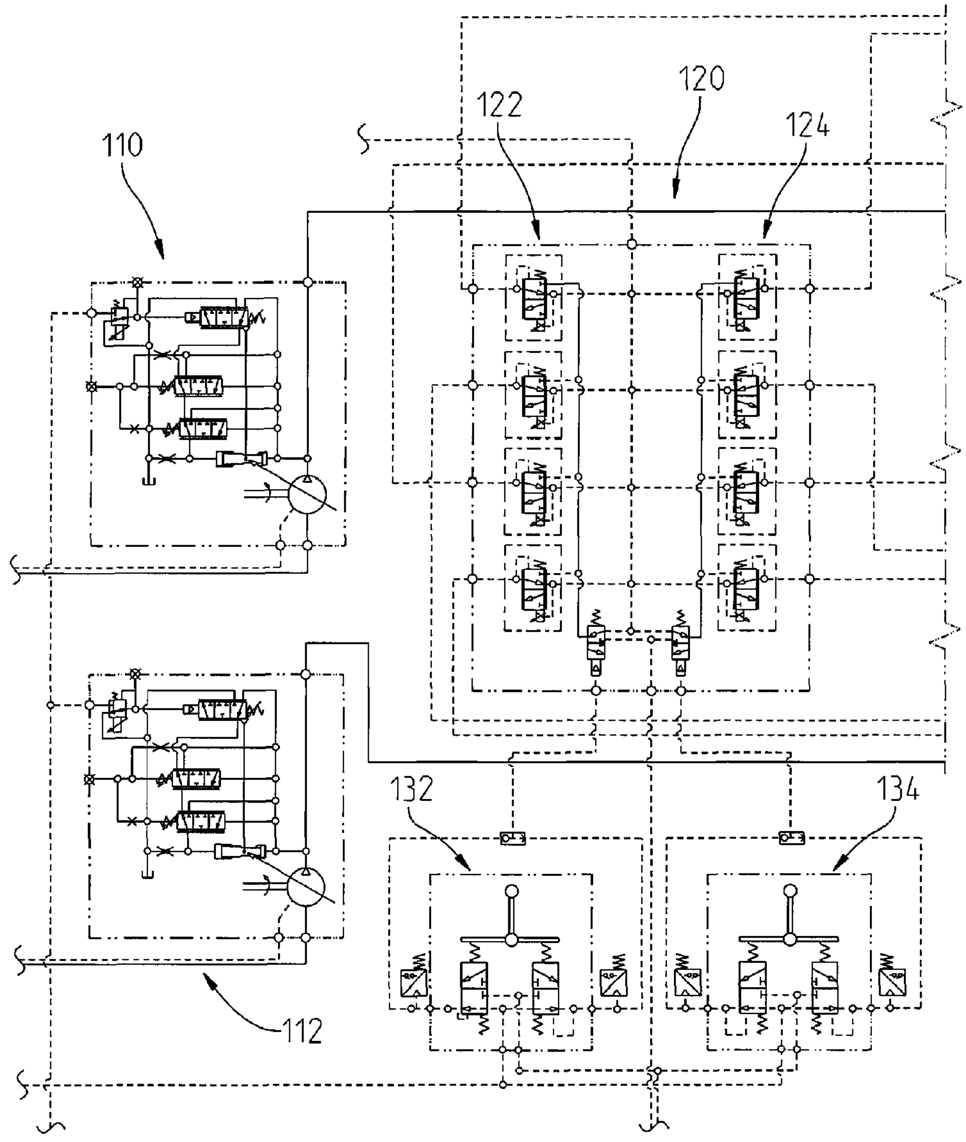
FIG. 1 shows a electric-hydraulic system including a plurality of hydraulic sources coupled to a plurality of load functions through a series of actuators and valves with control inputs provided by a plurality of operator input devices.

For the purposes of promoting an understanding of the principles of the novel invention, reference will now be made to the embodiments described herein and illustrated in the drawings and specific language will be used to describe the same. It will nevertheless be understood that no limitation of the scope of the novel invention is thereby intended, such alterations and further modifications in the illustrated devices and methods, and such further applications of the principles of the novel invention as illustrated therein being contemplated as would normally occur to one skilled in the art to which the novel invention relates.

Figure 1B:
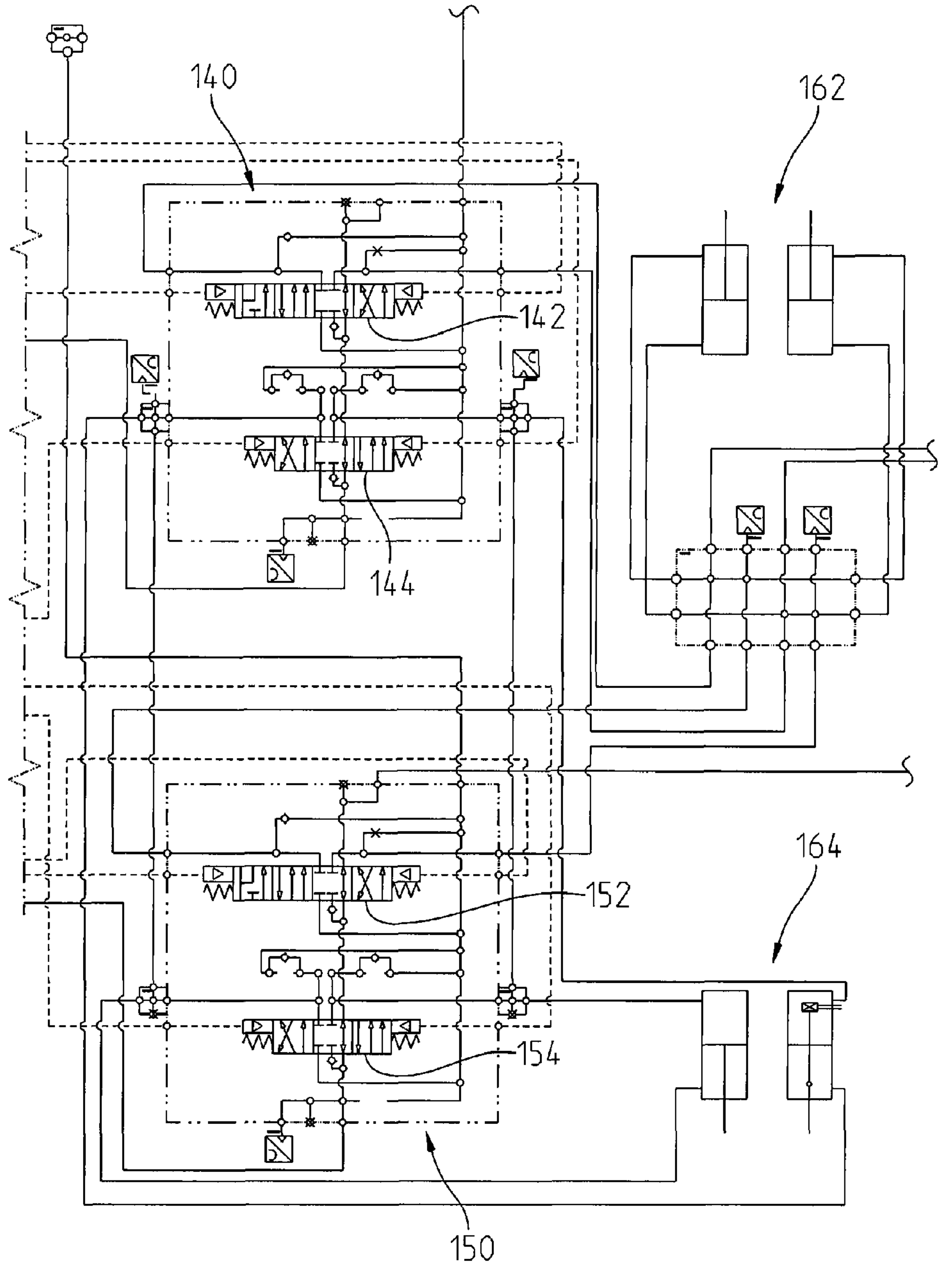

FIG. 1 shows a hydraulic system 100 that includes a plurality of pumps and a plurality of valves to minimize hydraulic losses during a work cycle. The hydraulic system 100 includes a first hydraulic pump 110, a second hydraulic pump 112, a plurality of spool actuators 120, a first operator input device 132, a second operator input device 134, a first valve stack 140, a second valve stack 150, a first function actuator 162 and a second function actuator 164. The function actuators 162, 164 are represented by hydraulic cylinders but can be any type of hydraulic actuation methods, for example, cylinders, motors, rotary actuators, etc.

The plurality of spool actuators 120 includes a first set of spool actuators 122 controlled by the first operator input device 132, and a second set of spool actuators 124 controlled by the second operator input device 134. The first valve stack 140 includes a first valve spool 142 controlled by the first set of spool actuators 122, and a second valve spool 144 controlled by the second set of spool actuators 124. The second valve stack 150 includes a first valve spool 152 controlled by the first set of spool actuators 122, and a second valve spool 154 controlled by the second set of spool actuators 124. The operator input devices 132, 134 provide direction and magnitude inputs to a controller that can control the spool actuators 120, and the spool actuators 120 can control the valve stacks 140, 150 using various methods, including for example electrically, hydraulically or some combination thereof. In alternative embodiments, one operator input device can be used to provide inputs for multiple hydraulic functions.

The first and second pumps 110, 112 are coupled to one or more hydraulic reservoirs. The first pump 110, under control of the controller with inputs from the operator input devices 132, 134, provides flow to the first valve stack 140 through the spool actuators 120. The second pump 112, under control of the controller with inputs from the operator input devices 132, 134, provides flow to the second valve stack 150 through the spool actuators 120. The first spools 142, 152 of the first and second valve stacks 140, 150 control flow to the first function actuator 162. The second spools 144, 154 of the first and second valve stacks 140, 150 control flow to the second function actuator 164. The first and second function actuators 162, 164 receive the controlled flow from pumps 110, 112 to perform a desired function and the hydraulic fluid returns from the first and second function actuators 162, 164 to the one or more reservoirs that supply fluid to the pumps 110, 112.

Either or both of the first and second pumps 110, 112 can supply flow from the hydraulic reservoir through the first valves 142, 152 of the first and second valve stacks 140, 150 to the first function actuator 162. Likewise, either or both of the first and second pumps 110, 112 can supply flow through the second valves 144, 154 of the first and second valve stacks 140, 150 to the second function actuator 164. The first operator input device 132 provides inputs to control the first set of spool actuators 122 which position the first valves 142, 152 of the first and second valve stacks 140, 150 to direct the desired flow to the first function actuator 162. The second operator input device 134 provides inputs to control the second set of spool actuators 124 which position the second valves 144, 154 of the first and second valve stacks 140, 150 to direct the desired flow to the second function actuator 164.

If the first and second function actuators 162, 164 are utilized for different functions, for example if the first function actuator 162 is coupled to the boom of a wheel loader and the second function actuator 164 is coupled to the bucket of the wheel loader, then the pumps can supply different flows to the different functions as desired. For example, if the flow and pressure requirements for the boom and bucket are different but either pump can supply the desired flow to either function then one of the pumps, for example pump 110, can provide flow to the first function actuator 162 powering the boom while another pump, for example pump 112, can provide flow to the second function actuator 164 powering the bucket of the wheel loader. If the flow and pressure requirements for one function, for example the boom, are greater than one pump can supply, then one of the pumps, for example pump 110, can provide flow exclusively to the first function actuator 162 powering the boom while another pump, for example pump 112, can provide flow to both the first and second function actuators 162, 164. Enabling the hydraulic supplies to operate at significantly different pressures more reflective of the function loads can result in significant energy and fuel savings during the work cycle. The systems and methods described can be used with various types of construction, agricultural, forestry and other types of machinery.

If a single function is commanded or multiple functions are commanded, then flow from more than one of the hydraulic sources 110, 112 can be directed to any one of the commanded functions 162, 164 or shared in any ratio among the commanded functions. If there is a failure, for example of a valve or valve driver, then the system 100 can make use of the remaining components to continue to supply hydraulic fluid to each of the functions 162, 164. This can reduce system downtime, and can enable the system to operate in a partially-operational state until the necessary components for repair are available.

Though the system 100 shows only two hydraulic sources 110, 112 and two load functions 162, 164 with the associated operator input devices 132, 134, spool actuators 120 and valve stacks 140, 150, those of skill in the art will readily see that this can be expanded to a plurality (greater than two) hydraulic sources and load functions. The displacement of each of the hydraulic sources can be controlled electronically and independent of the other hydraulic sources. Each load function can have an operator input device to provide operator inputs to the controller. The controller can control a set of spool actuators that control flow from the plurality of hydraulic sources to the plurality of load functions. Each valve stack can include one or more spools, controlled by the controller and spool actuators, where the spools of a particular valve stack control flow from one of the hydraulic sources to one or more of the load functions. For each hydraulic source, the series of electronically controlled valves can direct hydraulic fluid to one or more functions and return hydraulic fluid from those functions to a reservoir. There may also be a mode switch for the operator to enter a desired machine mode. The instrumentation, operator input devices and controller can determine the actual machine mode, and can alter the commands to the pumps and valves based on the machine mode. Exemplary machine modes are described below.

Figure 2:
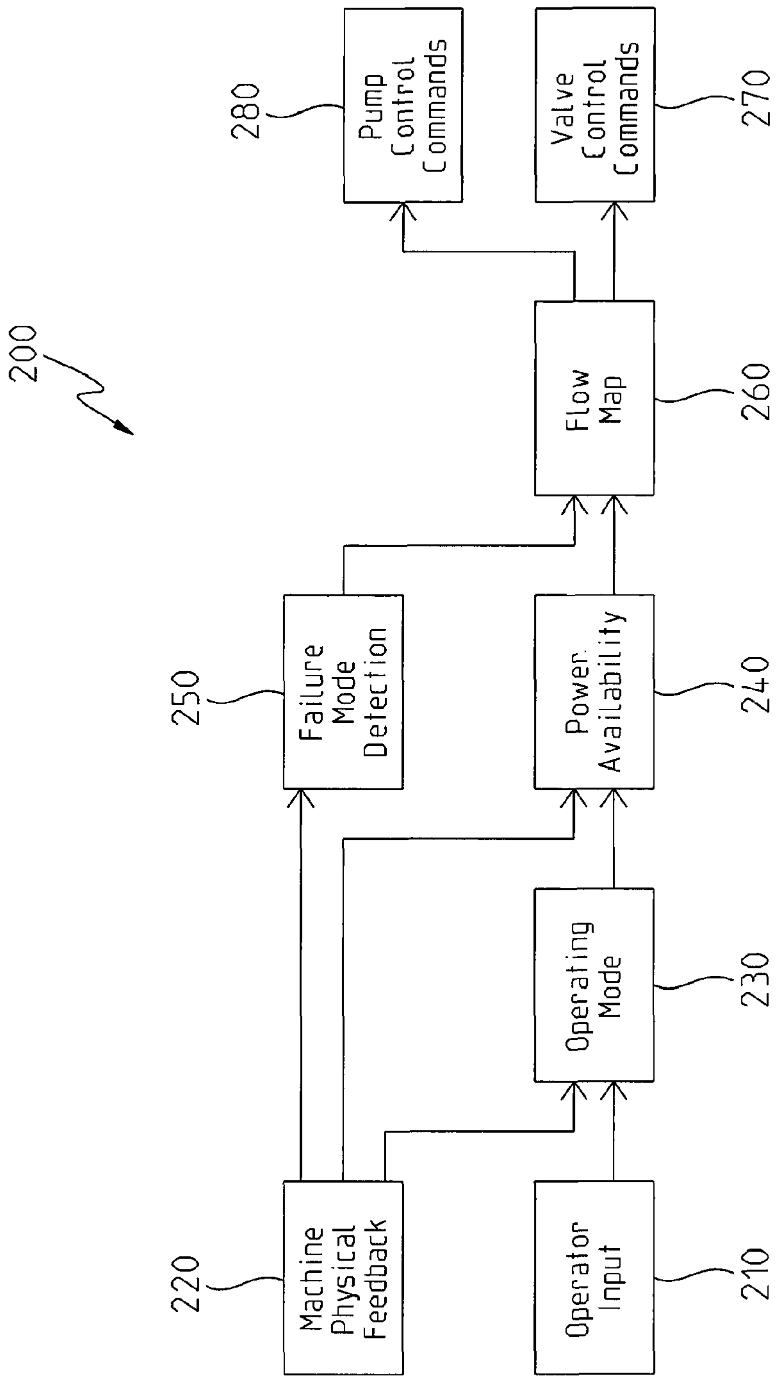
FIG. 2 is a diagram of an exemplary control flow for controlling an electric-hydraulic system.

FIG. 2 is a diagram of an exemplary control flow 200 for a controller that can be used with the exemplary hydraulic system 100 of FIG. 1. This is an iterative process that controller continues to adjust as operator inputs and machine feedback are processed.

At block 210 the controller accepts operator inputs, for example from the input devices 132, 134 of FIG. 1 which provide direction and magnitude inputs. There can be additional operator inputs, for example a mode selection switch to select different operating modes for the system. At block 220 the controller also receives physical feedback from the machine, for example load resistance or system status.

At block 230, the controller processes the operator inputs from block 210 and the physical machine feedback from block 220 and determines the actual operating mode for the machine. For example, the controller may override an operator selected operating mode due to some physical feedback from the machine. Some example of operating modes can include: economy (maximum fuel efficiency), productivity (maximum productivity) and normal (compromise between economy and productivity). Economy mode can be setup so that one pump is dedicated to supply flow to one function, and another pump is dedicated to supply flow to another function. Productivity mode can be setup so that all of the pumps can always supply flow to all of the hydraulic functions. Normal mode can be setup so that all of the pumps can supply flow to all of the hydraulic functions, unless the flow requirement difference between the functions exceeds a threshold in which case one pump will be dedicated to supply flow to the high flow function, and another pump will supply flow to meet any remaining hydraulic function requirements.

At block 240, the controller determines the power availability of the system based on the machine physical feedback from block 220 and the operating mode determined at block 230. At block 250, the controller processes the machine physical feedback from block 220 and determines if there are any failure modes detected. The system may take specific actions to avoid any detected failures. For example, if a pump failed then the system could only utilize the other pumps to operate the hydraulic functions; or if a valve failed then the system could direct flow from the pumps to the hydraulic functions along a route that avoids the failed valve.

At block 260, the controller processes the power availability determined at block 240 and the failure modes detected at block 250 to determine a flow map from the hydraulic sources to the commanded machine functions through the various valves. At block 280, the controller sends the necessary pump control commands to the hydraulic pumps and, at block 270, the controller sends the necessary valve control commands to the valves and actuators to implement the flow map determined at block 260.

While exemplary embodiments incorporating the principles of the present invention have been disclosed hereinabove, the present invention is not limited to the disclosed embodiments. Instead, this application is intended to cover any variations, uses, or adaptations of the invention using its general principles. Further, this application is intended to cover such departures from the present disclosure as come within known or customary practice in the art to which this invention pertains.

We claim:

1. A hydraulic system comprising:

a first hydraulic source;

a second hydraulic source;

a first function actuator for performing a first function;

a second function actuator for performing a second function;

a first valve stack comprising a first valve for controlling flow from the first hydraulic source to the first function actuator, and a second valve for controlling flow from the first hydraulic source to the second function actuator;

a second valve stack comprising a first valve for controlling flow from the second hydraulic source to the first function actuator, and a second valve for controlling flow from the second hydraulic source to the second function actuator;

a controller for controlling flow from the first hydraulic source to the first function actuator through the first valve of the first valve stack, and for controlling flow from the first hydraulic source to the second function actuator through the second valve of the first valve stack, and for controlling flow from the second hydraulic source to the first function actuator through the first valve of the second valve stack, and for controlling flow from the second hydraulic source to the second function actuator through the second valve of the second valve stack;

wherein the controller receives failure data indicating regions of the system with functional disruptions, and the controller uses the failure data to direct flow from the first and second hydraulic sources to the first and second function actuators along a route that avoids the regions of the system with functional disruptions.

2. The hydraulic system of claim 1, wherein the controller can direct any ratio of flow from the first and second hydraulic sources to the first and second function actuators, including having the first hydraulic source providing flow to only one of the first and second function actuator and having the second hydraulic source providing flow to only the other of the first and second function actuator.

3. The hydraulic system of claim 1, wherein the controller can direct all flow from the first hydraulic source to the first function actuator and any ratio of flow from the second hydraulic source to the first and second function actuators.

4. The hydraulic system of claim 1, further comprising a first operator input device for providing operator inputs to the controller for controlling the first function actuator in performing the first function; and a second operator input device for providing operator inputs to the controller for controlling the second function actuator in performing the second function.

5. The hydraulic system of claim 1, further comprising an operator input device for providing operator inputs to the controller for controlling the first function actuator in performing the first function, and for controlling the second function actuator in performing the second function.

6. The hydraulic system of claim 1, further comprising a first valve actuator for positioning the first valve of the first valve stack, a second valve actuator for positioning the second valve of the first valve stack, a third valve actuator for positioning the first valve of the second valve stack, and a fourth valve actuator for positioning the second valve of the second valve stack.

7. The hydraulic system of claim 1, wherein the first and second valves of the first valve stack and the first and second valves of the second valve stack are spool valves.

8. The hydraulic system of claim 7, further comprising a first set of spool actuators for positioning the first spool valve of the first valve stack, a second set of spool actuators for positioning the second spool valve of the first valve stack, a third set of spool actuators for positioning the first spool valve of the second valve stack, and a fourth set of spool actuators for positioning the second spool valve of the second valve stack.

9. The hydraulic system of claim 1, further comprising a mode switch for operator selection of a desired mode for the hydraulic system; the controller using the selected desired mode in determining flow from the first hydraulic source to the first and second function actuators and from the second hydraulic source to the first and second function actuators.

10. The hydraulic system of claim 1, wherein the controller receives machine physical feedback; the controller using the machine feedback in determining flow from the first hydraulic source to the first and second function actuators and from the second hydraulic source to the first and second function actuators.

11. A control method for a hydraulic system of a machine, the hydraulic system comprising first and second hydraulic pumps to power first and second hydraulic functions of the machine, the hydraulic system being able to direct any ratio of flow from the first hydraulic pump to the first and second functions and from the second hydraulic pump to the first and second functions, the control method comprising:

receiving operator input for performing the hydraulic functions;

receiving physical feedback from the machine;

determining a determined operating mode for the machine using the operator input and the machine physical feedback;

determining power availability of the hydraulic system using the determined operating mode and the machine physical feedback;

detecting fault modes of the machine using the machine physical feedback;

determining a flow map for the hydraulic system using the power availability and the detected fault modes, the flow map defining an amount of flow from the first hydraulic pump to the first hydraulic function, an amount of flow from the first hydraulic pump to the second hydraulic function, an amount of flow from the second hydraulic pump to the first hydraulic function, and an amount of flow from the second hydraulic pump to the second hydraulic function;

sending pump control commands to the first and second pumps to implement the flow map; and sending valve control commands to valves and actuators of the hydraulic system to implement the flow map.

12. The control method of claim 11, wherein the detected fault modes indicate regions of the hydraulic system with functional disruptions, and the flow map is determined to direct flow from the first and second hydraulic pumps to the first and second hydraulic functions along a route that avoids the regions of the hydraulic system with functional disruptions.

13. The control method of claim 11, wherein the hydraulic system further comprises:

a first valve stack comprising a first valve for controlling flow from the first hydraulic pump to the first function actuator, and a second valve for controlling flow from the first hydraulic pump to the second function actuator;

a second valve stack comprising a first valve for controlling flow from the second hydraulic pump to the first function actuator, and a second valve for controlling flow from the second hydraulic pump to the second function actuator;

wherein the valve control commands are sent to control the first and second valves of the first valve stack and the first and second valves of the second valve stack.

14. The control method of claim 13, wherein the hydraulic system further comprises:

a first valve actuator for positioning the first valve of the first valve stack, a second valve actuator for positioning the second valve of the first valve stack, a third valve actuator for positioning the first valve of the second valve stack, and a fourth valve actuator for positioning the second valve of the second valve stack;

wherein the valve control commands are sent to control the first, second, third and fourth valve actuators.

15. The control method of claim 11, wherein the operator input is received from a first operator input device for providing operator inputs for controlling the first hydraulic function, and a second operator input device for providing operator inputs for controlling the second hydraulic function.

16. The control method of claim 15, wherein the operator input is further received from a desired mode switch for operator selection of a desired mode for the hydraulic system; the operator selected desired mode being used in determining the determined operating mode.

17. The control method of claim 11, wherein the determined operating mode is selected from an economy mode designed to utilize the hydraulic system focusing on fuel efficiency, a productivity mode designed to utilize the hydraulic system focusing on productivity, and a normal mode designed to utilize the hydraulic system balancing fuel efficiency with productivity.

18. The control method of claim 17, wherein in economy mode the first pump is dedicated to powering the first hydraulic function, and the second pump is dedicated to powering the second hydraulic function.

19. The control method of claim 17, wherein in normal mode both the first and second pumps are used to power both the first and second hydraulic functions, unless the machine physical feedback indicates a difference in flow requirements that exceeds a threshold in which case the first pump is dedicated to supplying the first hydraulic function and the second pump supplies any remaining flow requirements.

* * * * *